United States Patent [19]

Sommese et al.

[11] Patent Number: 5,529,588
[45] Date of Patent: Jun. 25, 1996

[54] METHOD OF DEWATERING COAL USING VINYL AMINE-CONTAINING COAGULANTS

[75] Inventors: Anthony G. Sommese; Krishnan J. Pillai, both of Naperville, Ill.

[73] Assignee: Nalco Chemical Company, Naperville, Ill.

[21] Appl. No.: 489,879

[22] Filed: Jun. 13, 1995

Related U.S. Application Data

[63] Continuation-in-part of Ser. No. 162,248, Dec. 6, 1993, abandoned.

[51] Int. Cl.$^6$ ........................................... C10L 5/00
[52] U.S. Cl. .................... 44/626; 209/5; 210/732; 210/733
[58] Field of Search .................. 44/626; 209/5; 210/732, 733

[56] References Cited

U.S. PATENT DOCUMENTS

| | | | |
|---|---|---|---|
| 4,217,214 | 8/1980 | Dubin | 210/733 |
| 4,400,176 | 8/1983 | Kutta | 44/626 |
| 4,415,337 | 11/1983 | Kutta et al. | 44/626 |
| 4,514,912 | 5/1985 | Janusch et al. | 44/626 |
| 4,705,640 | 11/1987 | Whittaker | 210/733 |
| 4,810,257 | 3/1989 | Lau et al. | 44/605 |
| 4,952,656 | 8/1990 | Lai et al. | 525/328.2 |
| 4,969,928 | 11/1990 | Wen et al. | 44/626 |
| 5,161,694 | 11/1992 | Youn et al. | 209/5 |
| 5,185,083 | 2/1993 | Smigo et al. | 210/733 |

*Primary Examiner*—Prince Willis, Jr.
*Assistant Examiner*—James M. Silbermann
*Attorney, Agent, or Firm*—James J. Drake; Robert A. Miller; Patricia A. Charlier

[57] ABSTRACT

The invention provides an improved method for dewatering coal tailing aqueous slurries in a twin belt press process. The method including the step of adding to the slurry a high molecular weight anionic flocculant followed by a coagulant containing vinylamine. The flocculated coal is then mechanically dewatered using a twin belt press.

10 Claims, No Drawings

METHOD OF DEWATERING COAL USING VINYL AMINE-CONTAINING COAGULANTS

REFERENCE TO RELATED PATENT

The present application is a continuation-in-part of application Ser. No. 08/162,248, filed Dec. 6, 1993 now abandoned, by Anthony G. Sommese and Krishnan J. Pillai, entitled "Polyvinylamine Coagulants for Use in Coal Refuse Dewatering," the disclosure of which is incorporated herein by reference.

BACKGROUND OF THE INVENTION

1. Field of the Invention

This invention relates generally to the treatment of coal tailings, and, more particularly, provides a method for improved belt press dewatering for coal.

2. Brief Description of the Prior Art

In the mining of coal, various types of shale and clay are produced along with the coal. To increase the heating value of the coal and to reduce hauling costs, a coal washing process is normally used. In this process, the coal is graded and the coarse sizes, generally greater than a ¼ of an inch in diameter, are then fed through a slurry vat in which the density of the vat media is closely controlled. The coal floats in the heavy media of the vat while heavier rocks sink to the bottom.

The smaller-sized fractions, less than a ¼ inch in diameter, may be processed in spiral concentrators, shaking tables, hydrocyclones. The smallest particles, less than ½ millimeter in diameter, are processed by froth flotation. In each of these steps, more coal is recovered and the refuse is dewatered as well as possible. While spiral concentrations, shaking tables, and hydrocyclones utilize differences in specific gravity, separation based on differences in specific gravity is inefficient for smaller-sized fractions. Thus, in these lower size ranges, differences in the surfaces characteristics between high ash particles and the cleaner low ash particles are relied on in order to separate the particles. This process is called froth flotation.

In the froth flotation process, the fine coal particles are fed to an agitation tank in the form of a slurry having solids levels typically at about 3 to 8 percent but sometimes as high as about 15 to 20 percent. The slurry is conditioned with a class of chemicals called collectors which selectively coat and thereby impart hydrophobicity to the coal particles while leaving the higher ash fractions untouched. A frother is then added and the slurry is conditioned. Air is then bubbled through the mixture. The hydrophobized coal particles stick to the bubbles and rise to the top of the tank in the form of a froth. High ash hydrophilic fractions remain in the slurry and are called tailings. The tailings, which typically constitute about 2 to 4 percent solids are then sent to a thickener to be settled, so that the water in the slurry may be reused in the process to thereby minimize or eliminate effluent flow. It is thus highly desirable to dewater this refuse slurry as efficiently as possible.

In the thickener, coagulants and flocculants are used to help dewater the slurry. Coagulants are added in order to neutralize charges on the particles in the slurry. The charge neutralized particles form pin or micro flocs. One commonly used and generally effective coagulant is polydiallyldimethylammonium chloride ("DADMAC") having a molecular weight of about 100,000 da. Treatment with such coagulants is then followed with treatment with a flocculant.

Flocculants work by gathering together the floc particles in a net, bridging from one surface to the other and binding the individual particles into large agglomerants. Flocculation not only increases the size of the flocced particles, it also affects the physical nature of the floc, so that the slurry will dewater at a faster rate because of the reduction of the gelatinous structure of the floc.

In the flocculation of tailing slurries, typical flocculants include anionic high molecule weight polymers, copolymers of acrylamide and acrylic acid (acrylates), polyacrylamides and polyacrylates having molecular weights from about 1,000,000 to about 20,000,000 da.

The flocs settle to the bottom of the thickener, and, after a short period of time form a compact bed. This bed is discharged as tailings from the bottom of the thickener in the form of a 30 to 40 percent solids slurry. The tailings are either sent to belt presses where they are further dewatered and then disposed of in tailing ponds or sent directly to tailings ponds.

Further dewatering of the coal slurry is usually accomplished using a twin belt press. The press uses a combination of gravity and gradually applied pressure to mechanically dewater the slurry. Coagulants and flocculants are added to the slurry to facilitate the dewatering process. The coagulant and flocculant improve dewatering by improving the drainage of water from the slurry. Although the order of addition can be varied, generally, for twin belt press dewatering operations, the flocculant is often added to the slurry before the coagulant is added.

SUMMARY OF THE INVENTION

The invention provides a method for dewatering coal slurries using a twin belt press. The method consists of 1) adding to the slurry a high molecular weight anionic flocculant, 2) adding a second polymer containing vinylamine and 3) then adding the treated slurry to a twin belt press for further dewatering.

DESCRIPTION OF THE PREFERRED EMBODIMENTS

The invention provides a coagulant composition and a method of using the same. The invention provides improved coagulation and improved drainage of water from coal tailings in a twin belt press process. The invention uses a polymer containing vinylamine to accomplish this goal. In thickener applications, the polymers of the invention may be added before or after the slurry is flocculated with a standard flocculant in the industry. Preferably, in twin belt press applications, the coagulants of the invention are added after the slurry is flocculated.

For purposes of this invention, polyvinylamine consists of vinylamine and those monomers which are hydrolyzable to the following formula:

wherein: R is, preferably, one substituent group selected from the group consisting of hydrogen and an alkyl group having from 1–10 carbon atoms. More preferably, R is hydrogen or is an alkyl group having 1–4 carbons.

In a preferred embodiment of the invention, the vinylamine-containing polymer is a homopolymer of polyvinylamine. In an alternative embodiment, the vinylamine-containing polymer is a copolymer comprised of from about 1 to 99 percent by weight vinylamine and from about 99 to 1 percent by weight vinylformamide. In yet another embodiment of the invention, the vinylamine-containing polymer is a copolymer of two compounds selected from the group consisting of an amide, an ester, nitriles and salts of acrylic acid or methacrylic acid. The vinylamine-containing polymers of the invention are preferably used in conjunction with a high molecular weight flocculant. Preferably, the flocculant has a molecular weight greater than 2 million daltons. The preferred flocculants include anionic copolymers selected from the group consisting of acrylamide/sodium acrylate, acrylamide/acrylamidopropyl sulfonic acid (AMPS) and poly(sodium acrylate).

The polyvinylamine polymers of the invention preferably have molecular weights of from about 10,000 to about 5,000,000 daltons (da). More preferably, the polyvinylamine polymers of the invention have a molecular weight of from about 100,000 to about 3,000,000 da. Most preferably, however, the poly-vinylamine polymers of the present invention have molecular weight of from about 750,500 to about 3,000,000 da.

The coagulant compositions of the present invention are applied to the coal tailings slurry as a dilute aqueous solution. Preferably, the aqueous solution is applied to the coal tailings slurry in a dosage of from about 0.1 to about 200.0 parts per million (ppm) of the polymers of the invention based on the total volume of the slurry. More preferably, the polymers of the invention are added to the slurry in a dosage of from about 1.0 to about 100 parts per million. Most preferably, the polymers of the invention are added to the slurry in a dosage of from about 2.0 to about 50.0 parts per million.

Processes for making the polymers of the invention are well known in the art. U.S. Pat. Nos. 5,126,395, 5,037,927, 4,952,656, 4,921,621, 4,880,497 and 4,441,602 all describe methods for preparing the polymers of the invention. Solution polymerization produces the desirable molecular weight range. The resulting polymers are susceptible to alkaline hydrolysis which converts all of the amide groups to amine groups. This hydrolysis phenomena is described in U.S. Pat. No. 4,421,602, the disclosure of which is incorporated herein by reference.

Unlike other amine-containing polymers like poly(DAD-MAC) or Epichlorohydrindimethylamine polymers the amine containing polymers of this invention do not possess a permanent charge. These polymers can best be described as having a transient positive charge that is dependent on the pH of the system. At high pH the amines are unprotonated, at low pH they adopt a positive charge, at intermediate pH only a portion of the amines are protonated, the other amine groups can be viewed as "free" amines that can interact as a 1° amine.

The following examples are presented to describe preferred embodiments and utilities of the invention and are not meant to limit the invention unless otherwise stated in the claims appended hereto.

EXAMPLE 1

The coagulants of the invention were evaluated using a gravity dewatering test. The gravity dewatering test is a standard test in the industry and is a valuable tool for reliably screening and evaluating coagulants for twin belt press dewatering. Results obtained in testing can be directly translated to the plant process. The following procedure outlines the steps used in performing the test.

Five to ten gallons of untreated coal tailing slurry feed was obtained. Using a mixer, the slurry was mixed to uniformly disperse any coarse solids. Five hundred ml of slurry was transferred into a 500 ml graduated cylinder.

The coagulant was prepared as a 1% aqueous solution. The cylinder was inverted four times to thoroughly disperse the solids, then immediately 68 ppm of flocculant was added to the slurry. The cylinder was then inverted four additional times. The flocculant used was NALCO® 9810, a standard flocculant in the industry. The coagulant solution is then immediately added to the slurry and inverted two additional times. The coagulants used are identified in Table 1 below. The control was coagulant "A". Coagulant A was NALCO® 9853, a standard coagulant used in this application in the industry.

TABLE 1

| A | NALCO ® 9853 | — |
|---|---|---|
| B | PVA | 2–6 million |
| C | PVA | 1–2 million |
| D | PVA | 200,000–500,000 |
| E | PVA | Coagulant (CAT) |
| F | PVA | 10,000–20,000 |

PVA - Polyvinylamine

The conditioned slurry was poured over a fine mesh, and immediately the amount of water draining was collected and measured as a function of time. The drainage was collected and recorded every ten seconds for a time period greater than actual plant process time for gravity drainage. It is desirable to have the water drain as fast as possible at the lowest possible polymer dose. The results are summarized in Table 2.

TABLE 2

| | Reagent | | Dose (ppm) | | Inversions | | Free Drainage Volume (ml) | | | | |
|---|---|---|---|---|---|---|---|---|---|---|---|
| # | Floc | Cat | Floc | Cat | Floc | Cat | 10 Sec | 20 Sec | 30 Sec | 40 Sec | 60 Sec |
| 1 | 9810 | A | 68 | 7.50 | 4 | 2 | 42 | 64 | 70 | 74 | 80 |
| 2 | 9810 | A | 68 | 3.75 | 4 | 2 | 32 | 48 | 58 | 66 | 71 |
| 3 | 9810 | A | 68 | 1.88 | 4 | 2 | 28 | 46 | 52 | 60 | 68 |
| 4 | 9810 | B | 68 | 7.50 | 4 | 2 | 56 | 76 | 82 | 88 | 92 |
| 5 | 9810 | B | 68 | 3.75 | 4 | 2 | 44 | 61 | 78 | 84 | 90 |
| 6 | 9810 | C | 68 | 7.50 | 4 | 2 | 42 | 58 | 70 | 76 | 82 |
| 7 | 9810 | C | 68 | 3.75 | 4 | 2 | 46 | 66 | 74 | 80 | 84 |
| 8 | 9810 | D | 68 | 7.50 | 4 | 2 | 40 | 52 | 66 | 72 | 80 |
| 9 | 9810 | D | 68 | 3.75 | 4 | 2 | 36 | 46 | 58 | 66 | 76 |
| 10 | 9810 | E | 68 | 7.50 | 4 | 2 | 50 | 68 | 77 | 80 | 86 |
| 11 | 9810 | E | 68 | 3.75 | 4 | 2 | 44 | 59 | 70 | 77 | 84 |
| 12 | 9810 | F | 68 | 7.50 | 4 | 2 | 30 | 46 | 56 | 62 | 70 |

TABLE 2-continued

| # | Reagent | | Dose (ppm) | | Inversions | | Free Drainage Volume (ml) | | | | |
|---|---|---|---|---|---|---|---|---|---|---|---|
| | Floc | Cat | Floc | Cat | Floc | Cat | 10 Sec | 20 Sec | 30 Sec | 40 Sec | 60 Sec |
| 13 | 9810 | F | 68 | 3.75 | 4 | 2 | 25 | 36 | 42 | 52 | 66 |

As shown in Table 2, the polymers of the invention consistently outperformed the standard coagulant in the industry (polyDADMAC). Focusing on the 10 and 20 second drainage values (since they most effectively model the drainage times in industry), the vinylamine-containing coagulants of this invention provide equivalent or greater drainage at 3.75 ml than the industry standard. In fact, in selected samples, vinylamine polymers at ½ the dose give better drainage then the DADMAC coagulants. A possible explanation may lie in the fact that the amine polymers of the invention are not fully charged and "free amine" groups may interact with the coal and or flocculant to provide more effective drainage.

Changes can be made in the composition, operation and arrangement of the method of the present invention described herein without departing from the concept and scope of the invention as defined in the following claims

We claim:

1. An improved method for belt press dewatering of coal tailings in a coal slurry, comprising:
    adding to the coal slurry a high molecular weight anionic flocculant;
    adding a vinylamine-containing copolymer comprised of from about 1 to 99 percent by weight vinylamine and from about 99 to 1 percent by weight vinylformamide to the coal slurry; and
    subjecting the slurry to mechanical dewatering using a twin belt press.

2. The method of claim 1 wherein the polyvinylamine is added to the slurry in a concentration of from about 0.1 to about 200 parts per million.

3. The method of claim 2 wherein the flocculant has a molecular weight greater than 2 million daltons.

4. The method of claim 2 wherein the polyvinylamine is added to the slurry in a concentration of from about 1.0 to about 100 parts per million.

5. The method of claim 4 wherein the polyvinylamine is added to the slurry in a concentration of from about 2.0 to about 50 parts per million.

6. The method of claim 3, wherein the vinylamine-containing polymer has a molecular weight ranging from about 10,000 to about 5 million daltons.

7. The method of claim 6, wherein the vinylamine-containing polymer has a molecular weight range of from about 100,000 to about 3,000,000 daltons.

8. The method of claim 7, wherein the vinylamine-containing polymer has a molecular weight range of from about 750,500 to about 3,000,000 daltons.

9. The method of claim 3, wherein the flocculant is an anionic copolymer selected from the group consisting of acrylamide/sodium acrylate, acrylamide/acrylamidopropyl sulfonic acid (AMPS) and poly(sodium acrylate).

10. An improved method for belt press dewatering of coal tailings in a coal slurry, comprising:
    adding to the coal slurry a high molecular weight anionic flocculant;
    adding a vinylamine-containing copolymer of two compounds selected from the group consisting of an amide, an ester, nitriles and salts of acrylic acid or methacrylic acid to the coal slurry; and
    subjecting the slurry to mechanical dewatering using a twin belt press.

* * * * *